(12) United States Patent
Bedingfield, Sr.

(10) Patent No.: US 7,925,990 B2
(45) Date of Patent: Apr. 12, 2011

(54) METHODS, SYSTEMS, AND PRODUCTS FOR CALENDARING APPLICATIONS

(75) Inventor: James C. Bedingfield, Sr., Lilburn, GA (US)

(73) Assignee: AT&T Intellectual Property I, L. P., Reno, NV (US)

( * ) Notice: Subject to any disclaimer, the term of this patent is extended or adjusted under 35 U.S.C. 154(b) by 584 days.

(21) Appl. No.: 11/095,391

(22) Filed: Mar. 31, 2005

(65) Prior Publication Data

US 2006/0224988 A1  Oct. 5, 2006

(51) Int. Cl.
*G06F 3/048* (2006.01)

(52) U.S. Cl. ........................................ 715/808; 715/764

(58) Field of Classification Search ................... 709/204, 709/217, 227; 715/764, 808
See application file for complete search history.

(56) References Cited

U.S. PATENT DOCUMENTS

| | | | |
|---|---|---|---|
| 5,097,429 A | 3/1992 | Wood | |
| 5,634,100 A | 5/1997 | Capps | |
| 5,842,009 A | 11/1998 | Borovoy et al. | |
| 5,855,006 A | 12/1998 | Huemoeller et al. | |
| 5,884,306 A | 3/1999 | Bliss et al. | |
| 5,970,466 A | 10/1999 | Detjen et al. | |
| 6,462,660 B1 | 10/2002 | Cannon | |
| 6,466,969 B1 | 10/2002 | Bunney et al. | |
| 6,504,908 B1 | 1/2003 | Bellomo et al. | |
| 6,587,036 B2 | 7/2003 | Somers | |
| 7,188,073 B1 * | 3/2007 | Tam et al. .......................... | 705/9 |
| 7,334,000 B2 * | 2/2008 | Chhatrapati et al. ....... | 707/104.1 |
| 2002/0024540 A1 | 2/2002 | McCarthy | |
| 2002/0076015 A1 | 6/2002 | Norwitz et al. | |
| 2003/0005150 A1 | 1/2003 | Thompson et al. | |
| 2003/0097361 A1 | 5/2003 | Huang et al. | |
| 2003/0171973 A1 | 9/2003 | Wilce | |
| 2004/0131050 A1 | 7/2004 | Beringer et al. | |
| 2004/0142711 A1 * | 7/2004 | Mahonen et al. ............. | 455/502 |
| 2004/0243547 A1 | 12/2004 | Chhatrapati | |
| 2005/0166222 A1 * | 7/2005 | Tully, Jr. et al. ................ | 725/33 |
| 2006/0074844 A1 | 4/2006 | Frankel et al. | |
| 2006/0150175 A1 * | 7/2006 | Etelapera ...................... | 717/168 |
| 2006/0252435 A1 * | 11/2006 | Henderson et al. ........... | 455/466 |
| 2009/0077601 A1 * | 3/2009 | Brailean et al. ............... | 725/109 |

OTHER PUBLICATIONS

Talking Reminder user manual, published 2004, pp. 1-26.
Gordon Padwick, ebook titled "Special Edition Using Microsoft Outlook 2002", published on May 17, 2001, pp. 1-42.

* cited by examiner

*Primary Examiner* — Sara England
(74) *Attorney, Agent, or Firm* — Scott P. Zimmerman PLLC

(57) ABSTRACT

Methods, systems, and products are disclosed for acknowledging a reminder in a calendaring application. One such method stores a calendar entry corresponding to an event and a rule. The rule comprises a reminder of the event. The reminder is presented according to the rule, and an acknowledgement of the reminder is received. A message is then communicated in real-time to similarly acknowledge a pending reminder that corresponds to the same event in another instance of the calendaring application.

18 Claims, 15 Drawing Sheets

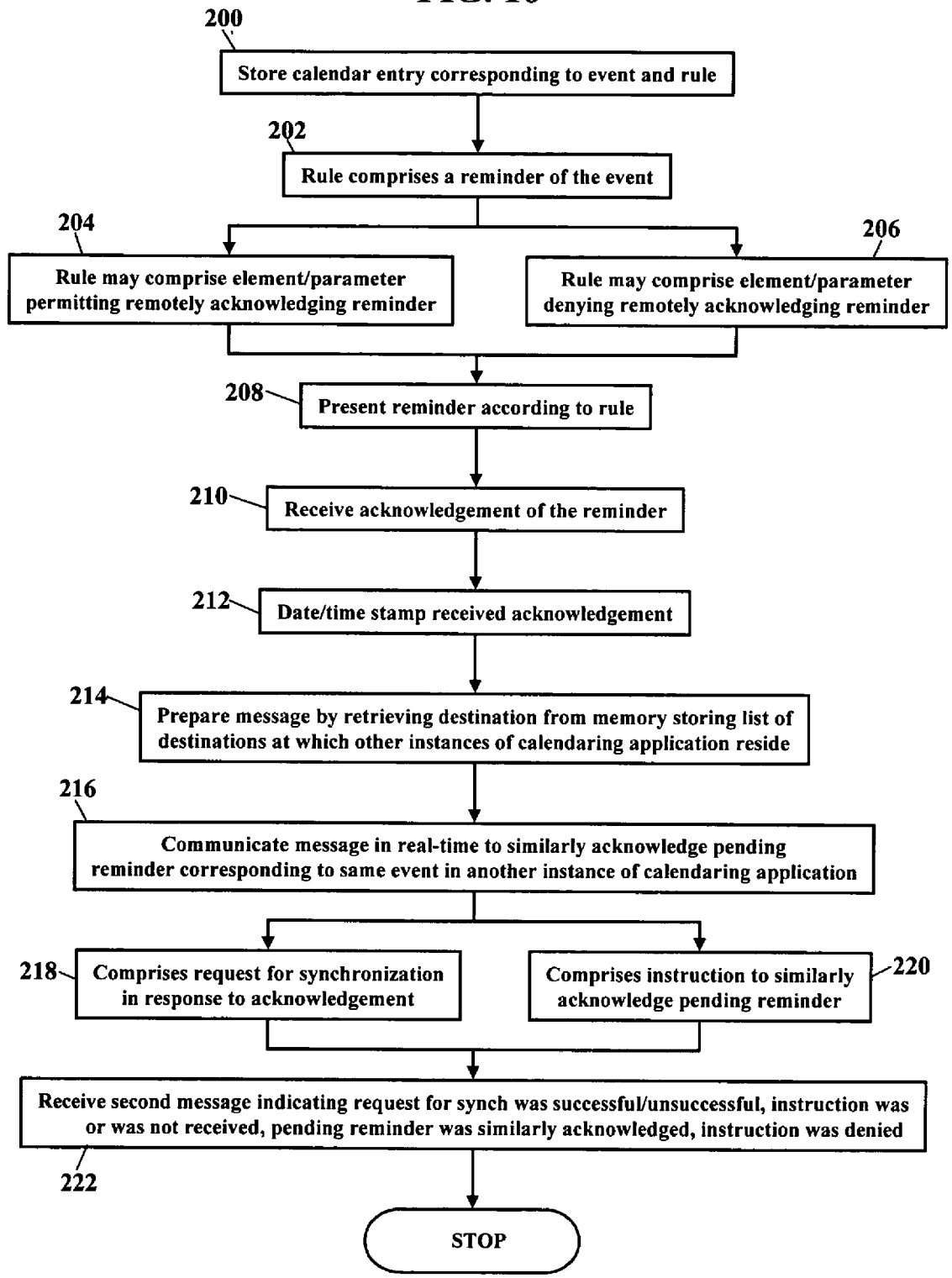

METHODS, SYSTEMS, AND PRODUCTS FOR CALENDARING APPLICATIONS

CROSS-REFERENCE TO RELATED APPLICATIONS

This application relates to the commonly assigned U.S. patent application Ser. No. 11/068,418, filed Feb. 28, 2005 and entitled "Methods, Systems, and Products for Calendaring Applications", and incorporated herein by reference.

NOTICE OF COPYRIGHT PROTECTION

A portion of this disclosure and its figures contain material subject to copyright protection. The copyright owner has no objection to the facsimile reproduction by anyone of the patent document or the patent disclosure, but otherwise reserves all copyrights whatsoever.

BACKGROUND

This application generally relates to electrical communications and to data processing and, more particularly, to scheduling, to task assignment, and to reminders in electronic calendaring applications.

Electronic calendaring applications utilize reminders. These calendaring applications allow users to create calendar entries and to associate the entries with dates and times. These calendaring applications also allow users to establish reminders of the calendared events. The user may even specify at what date and time the reminder is presented prior to the event.

These prior art reminders, however, have a common irritation. When the user synchronizes their calendar between different devices, the user can receive multiple reminders for a single entry. The user thus scrambles to silence the reminder produced by each device. It's not uncommon to have a PC, a PDA, a cell phone, and a pager all synchronized to remind the user of a calendar event. At similar times, then, all these devices may "ding," vibrate, or otherwise alert the user of the calendar event. The user must locate each device and acknowledge the reminder. What is needed, however, is the ability to acknowledge all the reminders from a single device.

SUMMARY

The aforementioned problems, and other problems, are reduced, according to the exemplary embodiments, using methods, systems, and products that acknowledge a reminder between multiple devices. The exemplary embodiments describe a calendaring application that the user maintains on one or more devices. That is, the user may maintain their calendar on multiple communications devices, such as a PC, a PDA, a cell phone, and/or a pager. The exemplary embodiments are also applicable to different devices operating different calendaring applications, but the different calendaring applications share entries, reminders, and other data, through the use of common or standardized data formats. When any of these devices "dings" or vibrates to alert the user of a calendared event, the user can acknowledge that reminder from a single device. That acknowledgement is then communicated effectively in real-time to all the other devices. The acknowledgement is communicated so that the user will not experience a perceptible delay in operation, although the actual background transaction may be taking place on a delayed basis. Even if all the devices are dinging/vibrating, the user need only locate one device and acknowledge the reminder. The exemplary embodiments will then communicate that acknowledgement to all the other devices, thus silencing all the reminders from a single device.

According to exemplary embodiments, the user can completely configure the acknowledgement. The user, for example, may globally configure the calendaring application to permit, or to deny, remote acknowledgement. The term "remote acknowledgement" and its variants mean reminders can be remotely acknowledged from other devices/locations. The exemplary embodiments first allow the user to specify whether remote acknowledgement is desired for all instances of the calendaring application. The user may also configure each device that stores the calendaring application for remote acknowledgement. That is, the user determines which devices can be remotely acknowledged. If a device participates in remote acknowledgement, that device can send/receive acknowledgements to/from other devices or applications. The user can also configure each calendar entry for remote acknowledgement. Each reminder may be individually configured to permit, or to deny, remote acknowledgement. The user may have calendar entries that should not be remotely acknowledged, but the user doesn't mind if other calendar entries are remotely acknowledged from other devices. The exemplary embodiments may even include a configurable arbitration mechanism. Because the user maintains several instances of their calendar on multiple devices, perhaps operating multiple applications, it is possible that the different instances may conflict. The exemplary embodiments, then, may need some mechanism that arbitrates between conflicting instances, as will be explained.

The exemplary embodiments include methods, systems, and products for acknowledging a reminder in an electronic calendar. One such exemplary embodiment stores a calendar entry corresponding to an event and a rule. The rule comprises a reminder of the event. When the electronic calendar presents the reminder, according to the rule, an acknowledgement is received. A message is then communicated effectively in real-time to similarly acknowledge a pending reminder that corresponds to the same event in another instance of the calendaring application.

In another of the embodiments, a system acknowledges a reminder in an electronic calendar. A calendaring application is stored in memory, and a processor communicates with the memory. The processor stores a calendar entry corresponding to an event and a rule, with the rule comprising the reminder of the event. The processor presents the reminder according to the rule and the processor receives an acknowledgement of the reminder. The processor communicates effectively in real-time a message to similarly acknowledge a pending reminder that corresponds to the same event in another instance of the calendaring application. If the calendaring application utilizes a "poll" solution, as will be later explained, the calendaring application may poll a central device or server. The calendaring application would poll to make sure, before activating a reminder, that that reminder has not already been acknowledged by another device or application.

In yet another embodiment, a computer program product acknowledges a reminder in an electronic calendar. The computer program product comprises a computer-readable medium and a calendaring application stored on the computer-readable medium. The calendaring application comprises computer code for storing a calendar entry corresponding to an event and a rule. The rule comprises a reminder of the event. The reminder is presented according to the rule and an acknowledgement is received. A message is communicated effectively in real-time to similarly acknowledge a pending reminder that corresponds to the same event in another instance of the calendaring application.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIG. 16 is a flowchart illustrating a method of acknowledging a reminder in an electronic calendar.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

The exemplary embodiments describe a calendaring application. This calendaring application allows remote acknowledge of a reminder between multiple devices. When a user maintains their calendar on multiple communications devices, the exemplary embodiments allow the user to acknowledge a reminder from a single device. That acknowledgement is then communicated effectively in real-time to all the other devices. Even if all the devices are dinging/vibrating, the user need only locate one device and acknowledge the reminder. The exemplary embodiments will then communicate that acknowledgement to all the other devices, thus silencing all the reminders from a single device.

Figure 1:
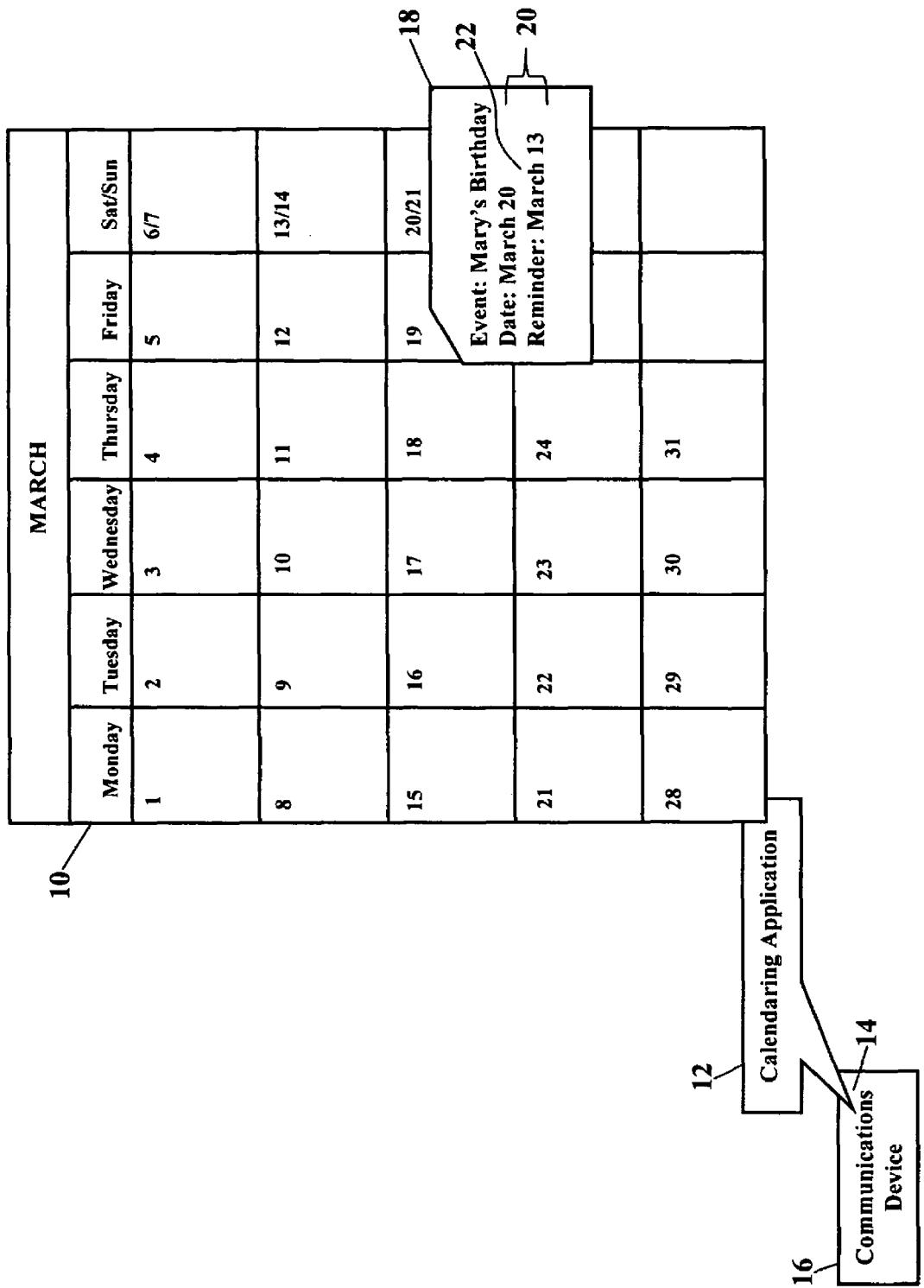
FIGS. 1 and 2 are schematics illustrating an electronic calendar produced by a calendaring application, according to the exemplary embodiments.
Figure 2:
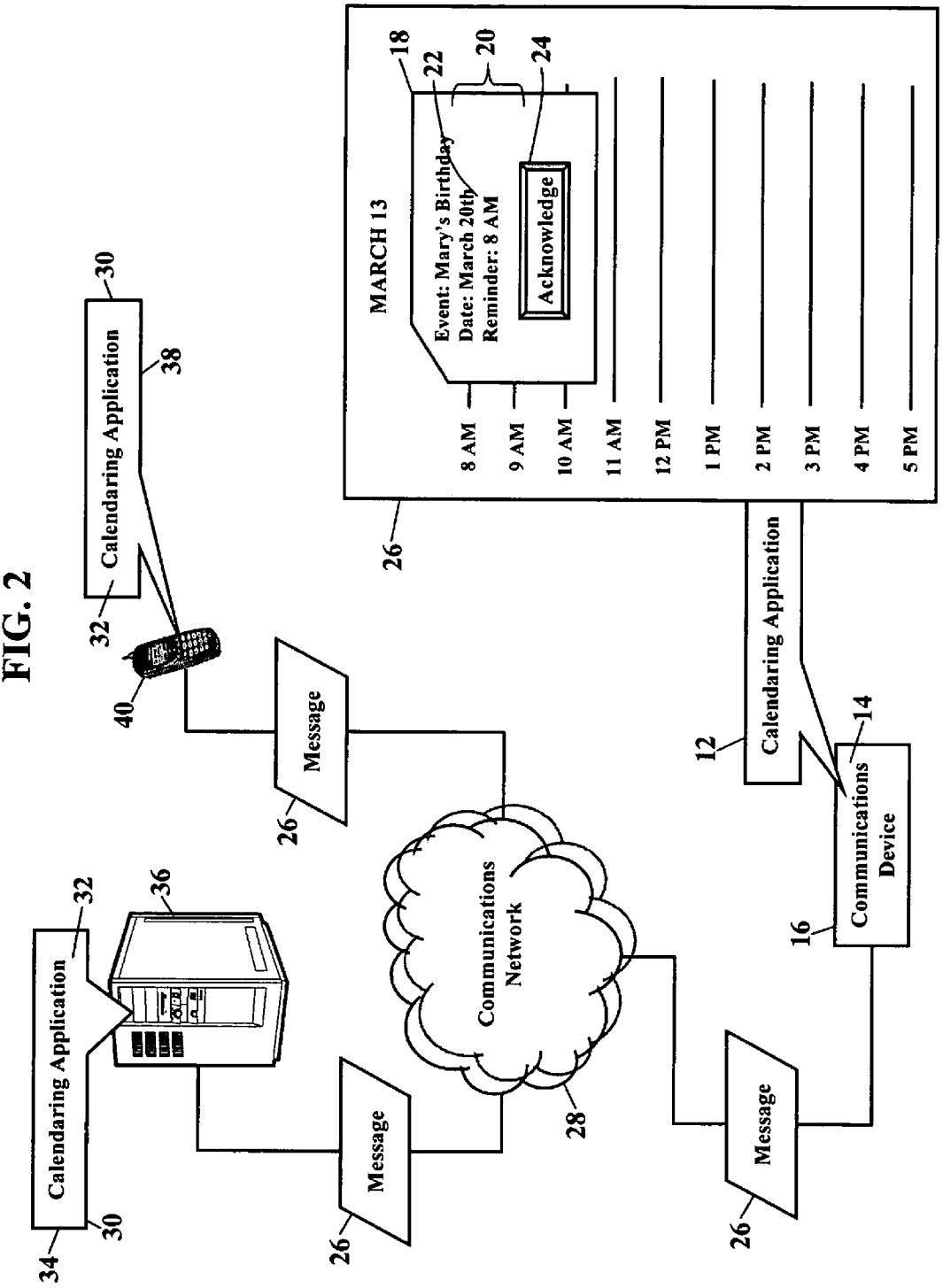

FIGS. 1 and 2 are schematics illustrating an electronic calendar 10 according to an exemplary embodiment. The electronic calendar 10 is produced by a calendaring application 12 stored in memory 14 of a communications device 16. Although the communications device 16 is generically shown, the communications device 16, as will be later explained, may be a computer, a personal digital assistant (PDA), a cordless/cellular/IP phone, or other wireline/wireless communications device. The calendaring application 12 stores or records an event 18, such as an appointment, a meeting, a holiday, a birthday, other occasion, important dates, deadlines, and/or anniversaries. The event 18 includes a rule 20. The rule 20 may comprise a date and/or a time at which the event is to occur. The calendaring application 12 stores a calendar entry corresponding to the event 18. As FIG. 1 shows, for example, the event 18 is "Mary's Birthday," and the rule 20 specifies an event date of March $20^{th}$. The rule 20 may also comprise a reminder 22. The reminder 22 may include a date and a time at which a notification or an alert is audibly and/or visually presented by the calendar application 12. The reminder 22 provides notice associated with the stored event 18. The alert, for example, may be an audible sound, alarm, and/or visual notification that reminds a user of the upcoming event 18.

FIG. 2 illustrates the reminder 22. The rule 20 specifies an event date of March $20^{th}$, and the reminder 22 is to be presented one week prior to Mary's birthday. FIG. 2, then, illustrates a visual presentation of the reminder 22 on March $13^{th}$, one week prior to Mary's birthday. The reminder 22 includes an opportunity for a user to acknowledge 24 the reminder 22. FIG. 2 shows the acknowledgement 24 as a graphical button that the user "clicks" with a pointing device or "taps" on a screen. The acknowledgement 24, however, can be any action, input, occurrence, or event that is recognized by the calendaring application 12. The acknowledgement 24 may include any actions that dismisses/cancels the reminder 22, delays the reminder 22, suspends the reminder 22, and/or other actions that will be explained. The acknowledgement 24 informs the calendaring application 12 that the reminder 22 was viewed, heard, smelled, felt, even tasted by the user. The acknowledgement 24 may be a keystroke on a keyboard, the push of a button on a pointing device, an input to a pressure-sensitive display, or any other input recognized by the calendaring application 12. The calendaring application 12, in fact, may not require an input, but, instead, self-acknowledge using software-defined conditions. However the reminder 22 is acknowledged, that acknowledgement 24 is received by the calendaring application 12.

FIG. 2 also illustrates a message 26. When the user acknowledges the reminder 22, the calendaring application then communicates the message 26 via a communications network 28. The message 26 is sent to other instances 30 of the calendaring application 12. The message 26 causes the other instances 30 of the calendaring application 12 to similarly acknowledge a pending reminder 32 that corresponds to the same event 18 in the other instances 30. These other instances 30 are similar representations of the calendaring application 12 that are stored/maintained on other devices and/or at other locations. The user, for example, may maintain a second instance 34 of the calendaring application 12 on a home computer 36 and a third instance 38 on a wireless phone 40. The message 26 communicates via the communications network 28 to the other instances 34 and 38 to immediately synchronize all representations of the calendaring application 12. The message 26 thus keeps all the instances 30 of the calendaring application 12 up-to-date with the acknowledgement 24. However the user acknowledges the reminder 22 (whether dismissal, cancellation, delay, suspension, saying a word or phrase, nodding to a camera, and/or other action), the message 26 causes the home computer 36 and the wireless phone 40 to similarly acknowledge the pending reminder 32 corresponding to the same event 18. The message 26 thus prevents both the home computer 36 and the wireless phone 40 from redundantly reminding the user of the same event 18.

The message 26 is sent effectively in real-time upon receipt of the acknowledgement 24. When the user acknowledges the reminder 22, the calendaring application then communicates the message 26 via a communications network 28. The message 26 is sent to all the other instances 30 of the calendaring application 12. Because the message 26 is sent with each acknowledgement 24, the message 26 is a synchronizing communication to all the instances 30 of the calendaring application 12. The message 26 causes all the instances 30 of the calendaring application 12 to intelligently mirror one another. All the user's instances of the calendaring application 12, regardless of device location, can be immediately updated with each acknowledgement.

The exemplary embodiments are also applicable to a "pull" solution. The above paragraphs describe a "push" solution, in which the calendaring application 12 pushes updates to other devices. The "pull" solution allows each individual device to periodically re-sync data to keep it current. Each instance 30 of the calendaring application 12 that is stored/maintained on another device, and/or at another location, would periodically poll the other instances for updates. If updates are available, each instance 30 would initiate a communication to "pull" those updates into memory. This "pull" or "poll" solution is especially applicable for devices or networks with intermittent access. Whether the exemplary embodiments utilize the "push" or "pull" solution, the calendar devices may all be synced to a central server, either effectively in real-time or sync mode.

The exemplary embodiments are also applicable to self-organizing devices. Some of the above paragraphs generally describe a controlling device that notifies other devices. Some of the other above paragraphs describe multiple devices that synchronize to a central server. The exemplary embodiments, however, are also applicable to other topologies. The exemplary embodiments, for example, may be applied to a network of equals. This network of equals describes data on any one device that is routinely synchronized with other devices, without a specified hierarchy. This network of equals is exemplified by the technology known as "smart dust"—that is, devices that self-organize.

The calendaring application 12, the reminder 22 and the message 26 are each customizable. As the following paragraphs will explain, the calendaring application 12 may be configured to include any or all of the features described herein. The calendaring application 12, for example, may be configured to permit, or to not permit, remote acknowledgement of the reminder 22. That is, should a reminder in one instance of the calendaring application 12 be acknowledged, the user determines whether similar reminders for similar events in other remote instances are similarly acknowledged. The message 26, too, can be configured according a message topography, network type(s) and conditions, protocols, and arbitration procedures. Those of ordinary skill in the art will also appreciate that there are many suitable implementations for the calendaring application 12 described herein. MICROSOFT®, for example, offers OUTLOOK® and OUTLOOK EXPRESS®, both of which provide electronic calendars (MICROSOFT®, OUTLOOK®, and OUTLOOK EXPRESS® are registered trademarks of Microsoft Corporation, One Microsoft Way, Redmond Wash. 98052-6399, 425.882.8080, www.Microsoft.com). Other vendors also offer other calendaring software applications, and the concepts described herein may be applied to any calendaring application by any vendor.

The calendaring application 12, the reminder 22 and the message 26 may be applied regardless of networking environment. The communications network 28 may be a cable network operating in the radio-frequency domain and/or the Internet Protocol (IP) domain. The communications network 28, however, may also include a distributed computing network, such as the Internet (sometimes alternatively known as the "World Wide Web"), an intranet, a local-area network (LAN), and/or a wide-area network (WAN). The communications network 28 may include coaxial cables, copper wires, fiber optic lines, and/or hybrid-coaxial lines. The communications network 28 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Figure 3:
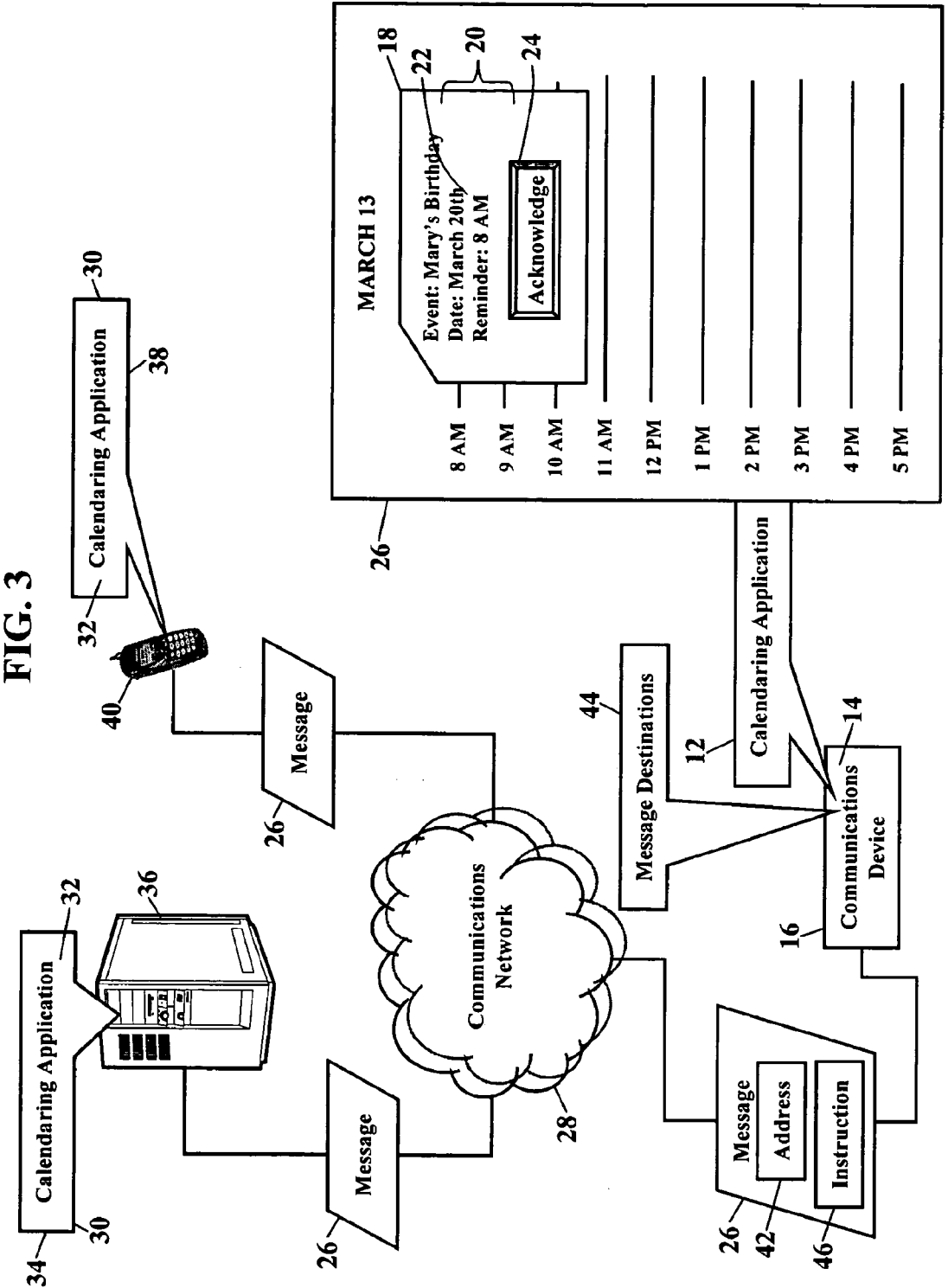
FIGS. 3 and 4 are schematics illustrating some possible details of a message that is communicated between devices, according to the exemplary embodiments.

FIG. 3 is a schematic illustrating some possible details of the message 26. The message 26, for example, may comprise an address portion 42. Before the message 26 is communicated, the calendaring application 12 may first need to know where each message 26 is to be sent. The calendaring application 12 may first retrieve one or more message destinations 44 from memory. Any local and/or remote memory location may store a list of destinations to which the message 26 is sent. Although the message destinations 44 may have any message topography, each destination preferably describes where each other instance 30 of the calendaring application 12 resides. FIG. 3, for simplicity, shows the message destinations 44 retrieved from the memory 14. The message 26, then, would include the address portion 42 containing the message destination 44 retrieved from memory 14.

The message 26 may also comprise an instruction 46. This instruction 46 could include information or coding that causes the other instances 30 of the calendaring application 12 to similarly acknowledge the pending reminder 32 for the same event. These other instances 30 are similar representations of the calendaring application 12 that are stored/maintained on other devices and/or at other locations. The message 26, for example, could communicate to the second instance 34 of the calendaring application 12 stored on the home computer 36. The message 26 could also communicate to the third instance 38 stored on the wireless phone 40. The message 26 instructs these other instances 34, 38 to immediately acknowledge the pending reminder 32 for the corresponding event. The message 26 thus keeps all the instances 30 of the calendaring application 12 up-to-date with the acknowledgement 24.

Figure 4:
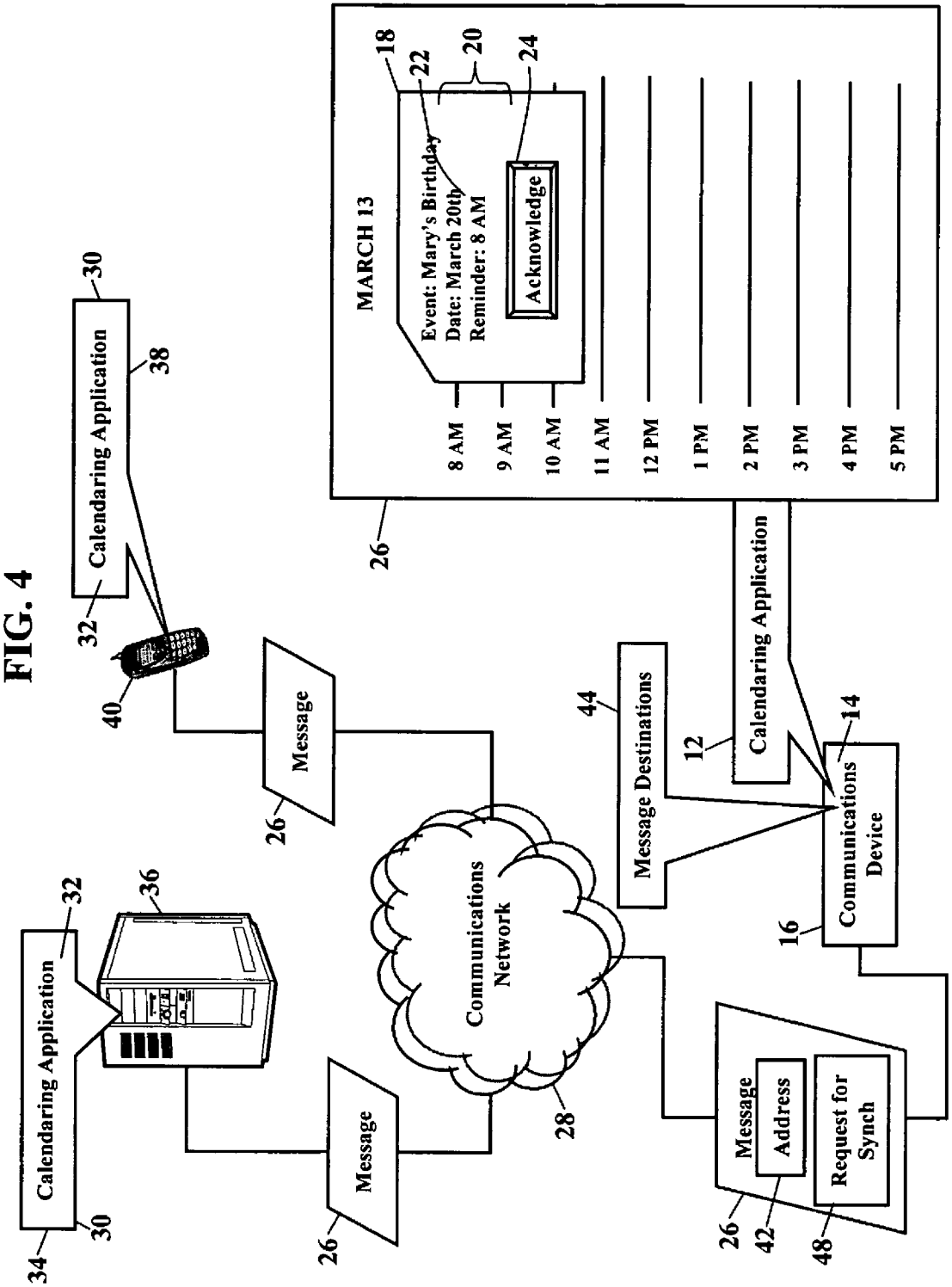

FIG. 4 is a schematic illustrating additional or alternative details of the message 26. The message 26, as before, may comprise the address portion 42. Here, however, the message 26 comprises a request 48 for synchronization (shown as "Request for Synch" for simplicity). The request 48 for synchronization could include information or coding that requests, initiates, or causes a wireless/wired synchronization process between communications devices. This synchronization process causes different instances of the calendaring application 12 to synchronize events, rules, and acknowledgements. The synchronization process would cause the other instances 30 of the calendaring application 12 to similarly acknowledge the pending reminder 32 for the same event. The message 26, for example, would cause the calendaring application 12 operating in the communications device 16 to synchronize with the second instance 34 of the calendaring application 12 stored on the home computer 36. The message 26, likewise, would cause the communications device 16 and the wireless phone 40 to synchronize. If the separate devices are capable of wireless communication, this synchronization could occur without user intervention. A wired synchronization would, of course, require a physical link. Here, then, each acknowledgement 24 would produce a corresponding request for synchronization.

The message 26 could also comprise other details or elements. The message 26, for example, could include a status bit (or bits) that indicate a status of the reminder 22. Whenever the user acknowledges the reminder 22, the message 26 could include a bit or bits that reflect the acknowledgement 24. The message 26 could also comprise a flag or other indicator that informs other instances of the acknowledgement. The message 26, in short, may have any element that indicates the acknowledgement 24 is being communicated to other instances of the calendaring application 12.

Figure 5:
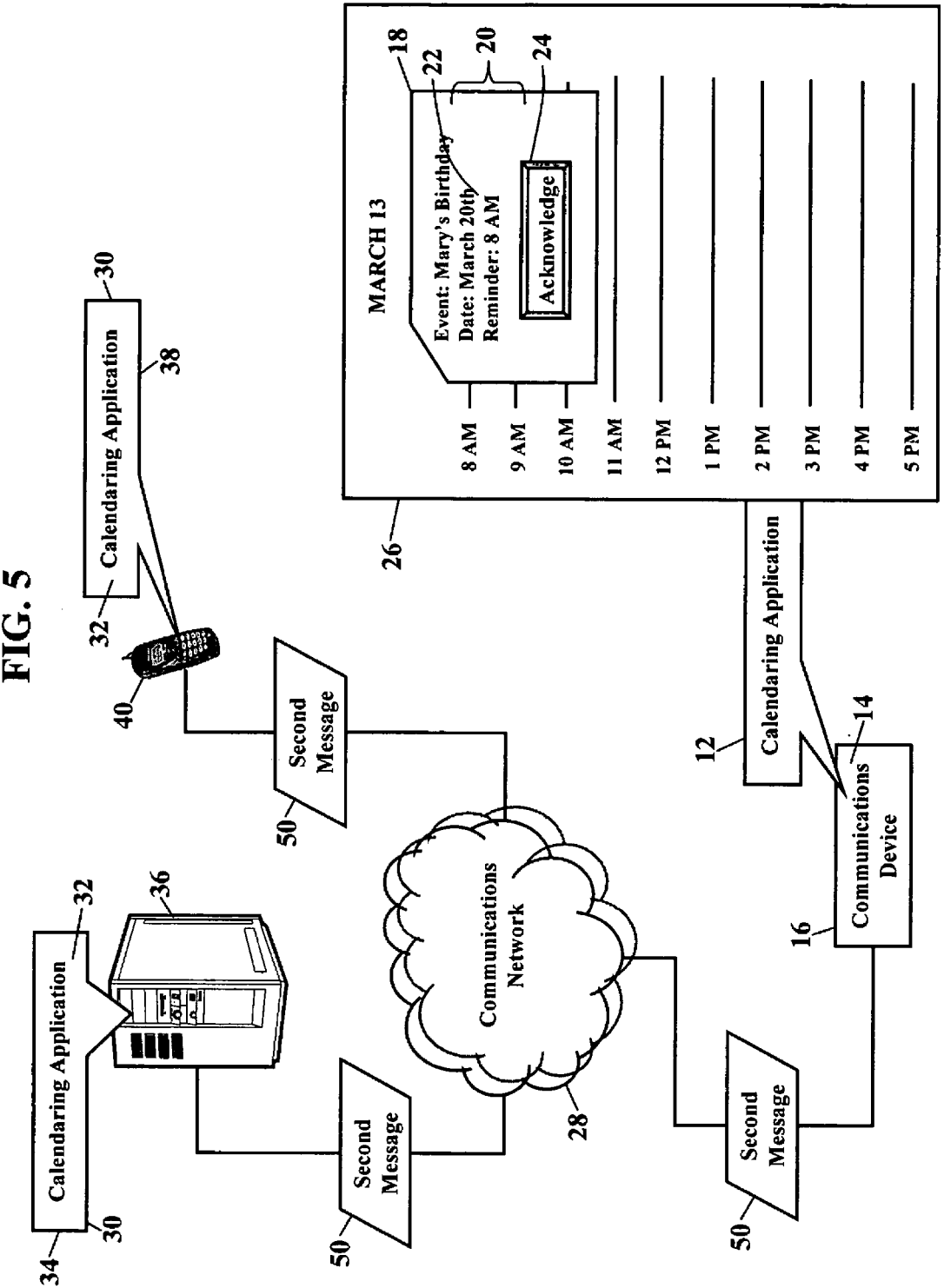
FIG. 5 is a schematic illustrating a second, return message, according to even more exemplary embodiments.

FIG. 5 is a schematic illustrating a second, return message 50. This incoming second message 50 provides a status of the outgoing message (shown as reference numeral 26 in FIGS. 3 and 4). The second, incoming message 50 is used when the user configures the calendaring application 12 for "registered" communications, thus knowing receipt and processing occurred. The calendaring application 12 may even require registered communications between the various instances 30. The incoming second message 50 may indicate that a communication attempt was successful, failed, timed-out, or was rejected by the destination. The second message 50, for example, may confirm receipt of the outgoing message 26 by the destination. The second message 50 may additionally or alternatively indicate that the outgoing message 26 was not received at the destination. The second message 50 may additionally or alternatively indicate that the pending reminder was similarly acknowledged at the destination. The second message 50 may additionally or alternatively indicate the destination denied or rejected the instruction 46 or the request 48 for synchronization. The second message 50 may additionally or alternatively indicate that the request 48 for synchronization was successful or unsuccessful (e.g., failed).

While this return message 50 may not typically be presented to the user, it will be useful to keep track of the status of a sync request, initiate a re-transmission of an unacknowledged request, keep track of the type of request (push or pull), also destinations, and time sent or received. This will be useful in troubleshooting message sync problems, and could be made available to certain technically advanced users or others with a need to know this sort of information.

Figure 6:
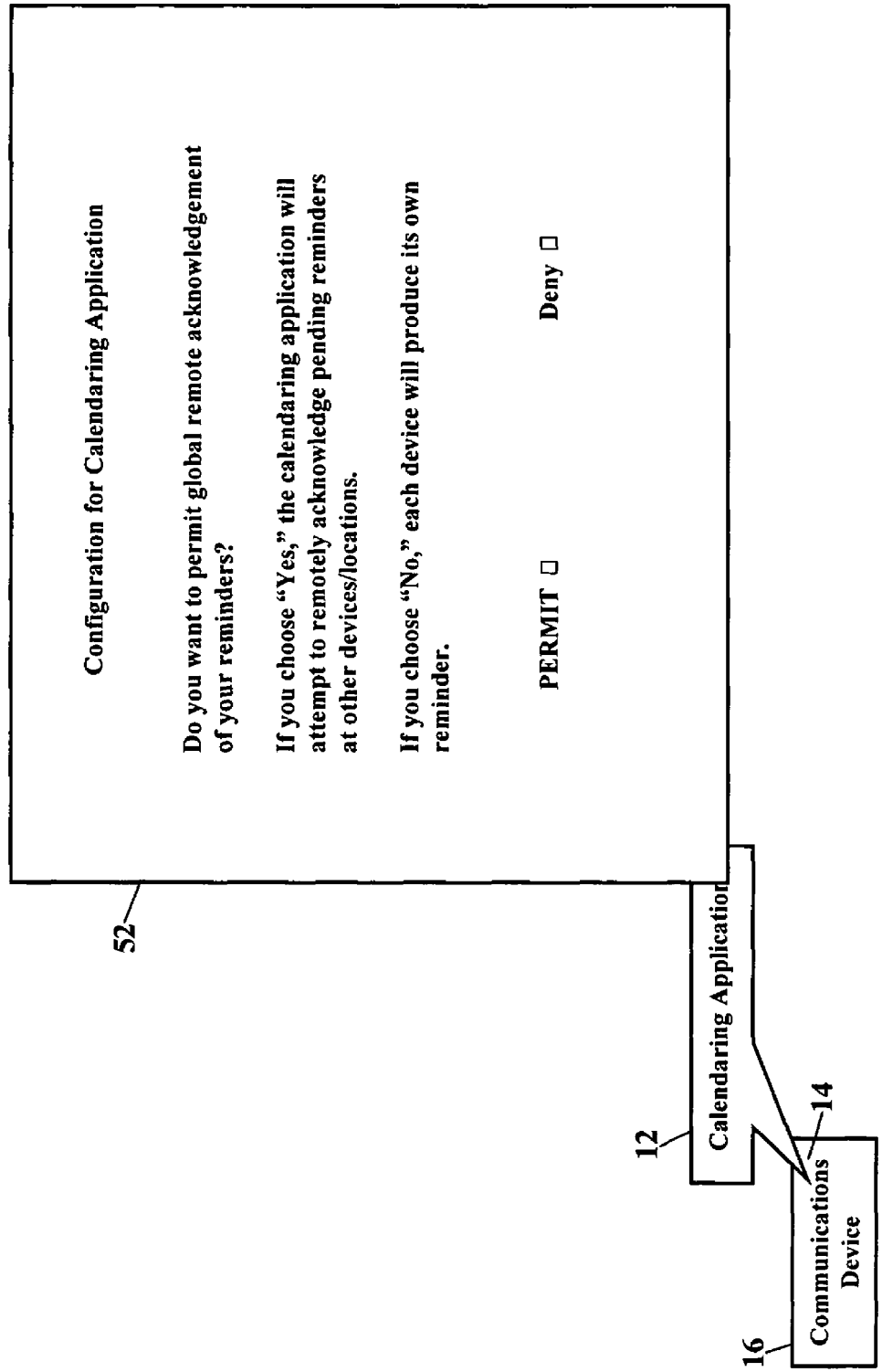
FIGS. 6-8 are schematics illustrating schemes for remote acknowledgement, according to more exemplary embodiments.
Figure 7:
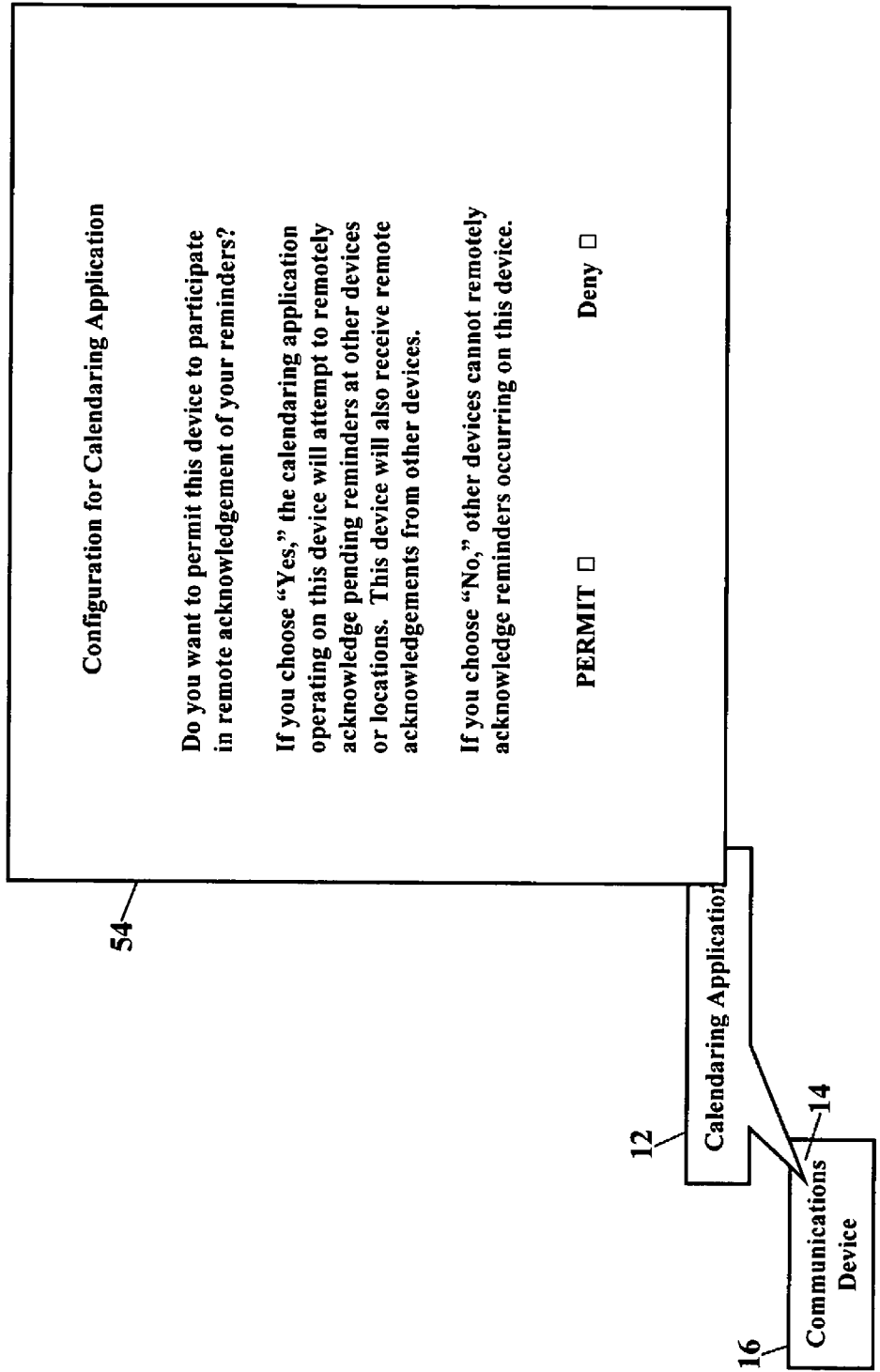
Figure 8:
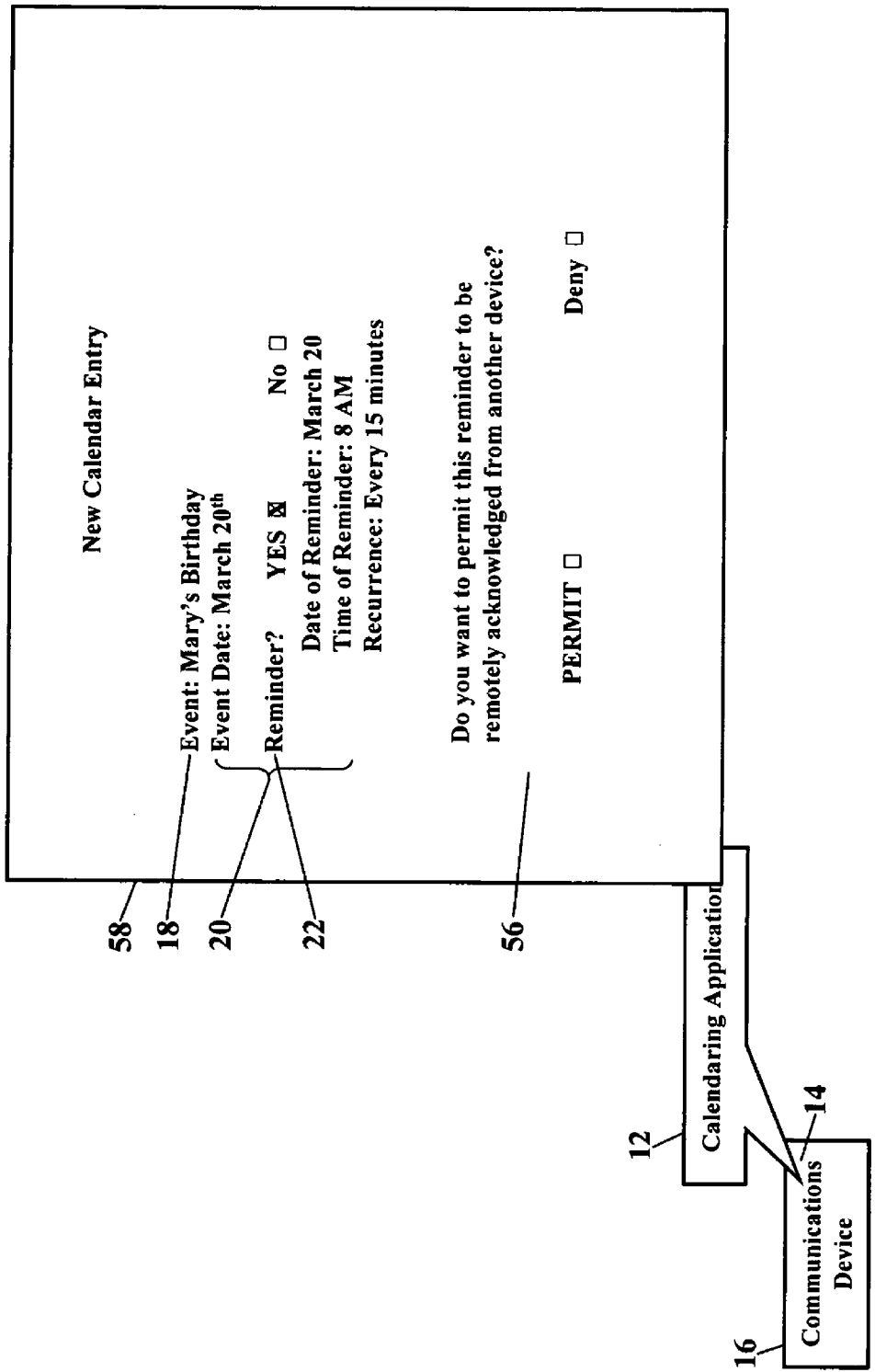

FIGS. 6-8 are schematics illustrating schemes for remote acknowledgement, according to more exemplary embodiments. The term "remote acknowledgement" means an instance of the calendaring application 12 will process the message 26 received from other instances. Recall the message 26 is sent to other instances 30 of the calendaring application 12, and the message 26 causes the other instances 30 to similarly acknowledge a pending reminder. FIGS. 6-8 illustrate how the user may configure the calendaring application 12 to permit, or to deny, remotely acknowledging the reminder 22. If, however, the user makes no explicit selection, the calendaring application 12 may include an optional "default" setting. This default setting is implemented when the user fails to make a selection.

FIG. 6 illustrates global remote acknowledgement. FIG. 6 shows that the calendaring application 12 may be globally configured to permit, or to deny, remote acknowledgement. The calendaring application 12 has a global configuration option 52. This global configuration option 52 allows the user to select whether remote acknowledgement is permissible. If the user selects "PERMIT," the calendaring application 12 will enable features that initiate the message 26 with each acknowledgement of a reminder. If the user selects "Deny," the calendaring application 12 will disable the message 26. The global configuration option 52, then, allows the user to first determine whether remote acknowledgement is desired for all instances of the calendaring application 12. If a central server hosts the calendar application 12 and/or data, the central server can make this global configuration option available to the individual calendaring devices.

FIG. 7 illustrates a device-level configuration option 54. FIG. 7 shows that each instance of the calendaring application 12 may be configured to permit, or to deny, remote acknowledgement. That is, individual instances of the calendaring application 12, operating on different devices, may be configured for remote acknowledgement. The device-level configuration option 54 allows the user to individually determine which instance of the calendaring application 12 participates in remote acknowledgement. Recall that the calendaring application 12 is stored in the memory 14 of the communications device 16. Recall also that the user maintains the second instance 34 of the calendaring application 12 on the home computer 36 and the third instance 38 of the calendaring application 12 on the wireless phone 40. The device-level configuration option 54 allows the user to determine which device participates in remote acknowledgement. The user, for example, may decide that remote acknowledgement is not desirable for the wireless phone 40. Perhaps, for example, the wireless phone 40 has an exposed keypad, so the exposed keys are often inadvertently pushed. Should a reminder be acknowledged by an inadvertent depression of a button, the user would not want that acknowledgement communicated to other instances of the calendaring application 12. The user, then, might decide the risk of inadvertent entries on the exposed keypad is too great, so remote acknowledgement is not desirable for the wireless phone 40.

FIG. 7, then, illustrates the device-level configuration option 54. The device-level configuration option 54 allows the user to individually determine which instance of the calendaring application 12 participates in remote acknowledgement. As FIG. 7 shows, the device-level configuration option 54 allows the user to individually determine i) whether the message 26 is sent from the device with each acknowledgement, and ii) whether messages from other instances are received and processed by the same device. If the user wants the communications device to send the message 26 effectively in real-time with each acknowledgement, the user selects "PERMIT." The calendaring application 12 will then enable features that initiate the message 26 with each acknowledgement of a reminder. If the user does not want the communications device to send the real-time message 26 with each acknowledgement, the user selects "Deny." Similarly, the user determines whether the calendaring application 12 is configured to receive and process messages from other instances/devices. If the user wants the communications device to receive and process effectively real-time messages from other instances/devices, the user selects "PERMIT." The calendaring application 12 will then enable features that receive and process the message 26 from other instances. If the user does not want the communications device to receive/process the real-time message 26, the user selects "Deny." The device-level configuration option 54 thus allows the user to individually determine which instance of the calendaring application 12 participates in remote acknowledgement.

FIG. 8 illustrates a reminder-level configuration option 56. FIG. 8 shows that each reminder may be individually configured to permit, or to deny, remote acknowledgement. Even though the user may configure the calendaring application 12 for remote acknowledgement, the user may decide that some individual calendar entries should not be remotely acknowledged. That is, the user wants to participate in remote acknowledgement, but the user has some calendar entries that should not be remotely acknowledged. A calendar event may be so important (perhaps an important meeting or a spouse's birthday) that the user wants multiple reminders from multiple instances/devices. Even if the user acknowledges the entry at one device, the user wants other instances at other devices to also remind of the calendar entry. The reminder-level configuration option 56 allows the user to individually each calendar entry for remote acknowledgement. Each user, in fact, may establish a user profile that stores custom reminder types from which the user can select. This profile, and its various reminder types, are more fully described in the commonly assigned U.S. patent application Ser. No. 11/068,418, filed Feb. 28, 2005 and entitled "Methods, Systems, and Products for Calendaring Applications", which is incorporated herein by reference in its entirety.

FIG. 8 illustrates a calendar entry 58. The calendar entry 58 includes the event 18 and the associated rule 20. The rule 20 comprises a date and/or a time at which the event 18 is to occur. The rule 20 may also comprise the reminder 22. The reminder 22 may include at least one of a date and a time at which a notification or an alert is audibly and/or visually presented by the calendar application 12. The calendar entry 58 also includes the reminder-level configuration option 56. The reminder-level configuration option 56 allows the user to individually determine whether the calendar entry 58 participates in remote acknowledgement. If the user wants the communications device to send the message 26 effectively in real-time when the reminder 22 is acknowledged, the user selects "PERMIT." The calendaring application 12 will then enable features that initiate the message 26 when the reminder 22 is acknowledged. If the user does not want the communications device to send the real-time message 26, the user selects "Deny." Similarly, the user determines whether the calendar entry 58 can be remotely acknowledged by another instance of the calendaring application operating on another communications device. If the user wants the reminder 22 to be remotely acknowledged—that is, effectively real-time messages from other instances/devices are received and processed—the user selects "PERMIT." If the user does not want the reminder 22 to be remotely acknowledged, the user selects "Deny." The reminder-level configuration option 56 thus allows the user to individually determine which calendar entries participate in remote acknowledgement.

The calendaring application 12 (whether device-based or in a central server) may also comprise an arbitration mechanism. When the user maintains several instances of their calendar on multiple communications devices, the calendaring application 12 may require some means of arbitrating between instances and/or messages. Because the user maintains several instances of their calendar on multiple communications devices, it is possible that the different instances may conflict. If the user permits one or more instances to participate in remote acknowledgement, it is also possible that the acknowledgement messages 26, sent from each instance, could conflict. The communications network 28, for example, might experience different levels and different areas of congestion, thus delaying some acknowledgements more than others. The calendaring application 12, then, may need some mechanism that arbitrates between conflicting instances and between conflicting messages. One example of an arbitration mechanism is to declare one device to always be the "master." The master device identifies conflicts and queries the user for resolving the conflict.

Figure 9:
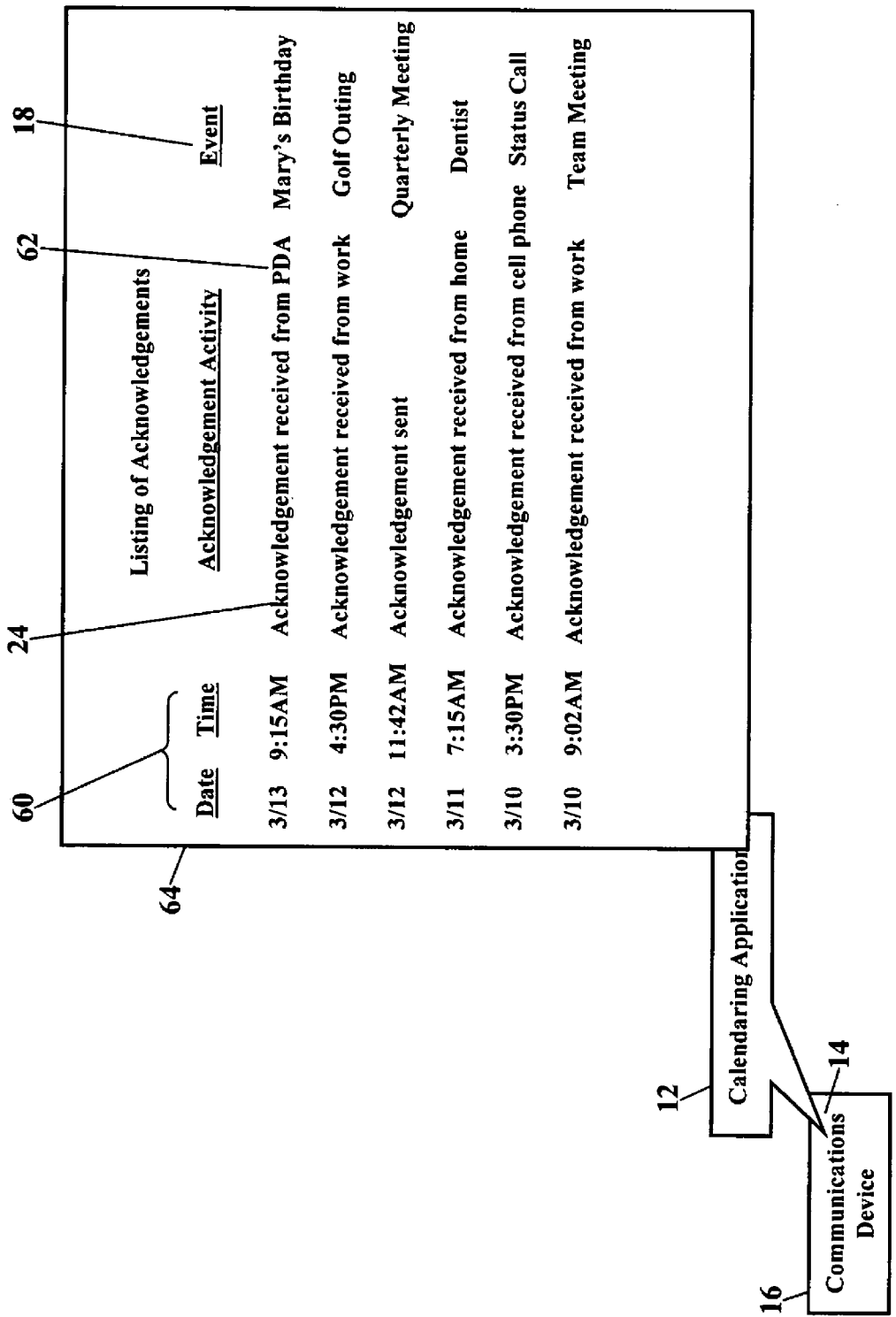
FIG. 9 is a schematic illustrating an arbitration mechanism according to yet more exemplary embodiments.

FIG. 9 is a schematic illustrating one such arbitration mechanism. FIG. 9 illustrates that the calendaring application 12 may use date/time stamps 60 and/or device addresses 62 to arbitrate between conflicting information. FIG. 9 shows a listing 64 of acknowledgements, with each acknowledgement 24 having a corresponding date/time stamp. When the user acknowledges the reminder 22, that acknowledgement 24 is date and time stamped. That same acknowledgement 24 may also be identified by the device at which the acknowledgement occurred. The listing 64 of acknowledgements, then, shows each acknowledgement 24 having a corresponding date/time stamp and device identifier. The listing 64 of acknowledgements also shows that each acknowledgement 24 also corresponds to its associated calendar event 18. Each time the calendaring application 12 receives the message 26 from another instance, the calendaring application 12 compares the date/time stamp 60 and/or the device address 62 associated with the message. The calendaring application 12 may then use the date/time stamp 60 and/or the device address 62 to determine whether the message should be processed.

An example might help explain the need for arbitration. Recall that the calendaring application 12 is stored in the memory 14 of the communications device 16. Recall also that the user maintains the second instance 34 of the calendaring application 12 on the home computer 36 and the third instance 38 of the calendaring application 12 on the wireless phone 40 (as FIGS. 2-5 show). The user has configured the communications device 16, the home computer 36, and the wireless phone 40 for remote acknowledgement. So, when the user acknowledges a reminder at one device, that acknowledgement is communicated to the other devices. Now suppose the internal clock sources for each device are slightly different, such that the wireless phone 40 is the first device to present a reminder to the user. The user picks up the wireless phone and dismisses (e.g., acknowledges) the reminder. The wireless phone 40 then communicates that acknowledgement to the communications device 16 and to the home computer 36.

Now, suppose the upload connection data rate of the wireless phone 40 is slower (perhaps much slower) that the download data rate. Before the wireless phone 40 can completely communicate the acknowledgement message 26, the home computer 36 presents its corresponding reminder. The user enters a keystroke at the home computer 36 to reschedule (e.g., acknowledge) the reminder. The home computer 36 then communicates that acknowledgement to the communications device 16 and to the wireless phone 40.

This example, then, has conflicting acknowledgements. First, the wireless phone 40 communicates its acknowledgement message while, at the same time (or nearly the same time), the home computer 36 communicates its corresponding acknowledgement message. Which acknowledgement message should the calendaring application accept as authoritative? Second, the user dismissed the reminder at the wireless phone 40, but at the home computer 36 the user rescheduled the reminder. Which acknowledgement is correct?

The arbitration mechanism resolves such conflicting information. If two or more acknowledgement messages conflict, the arbitration mechanism may use any combination of information to resolve the conflict. The arbitration mechanism, for example, may use the date/time stamp 60 associated with each acknowledgement message. Perhaps the arbitration mechanism is configured to use the earliest date/time stamp as the authoritative acknowledgement. Or, perhaps the latest date/time stamp is authoritative. Perhaps one instance of the calendaring application, operating on a particular device, is the "master" and has precedence over all other instances. That is, the calendaring application 12 operating on the home computer 36 takes precedence over all other instances/devices, such that any acknowledgement messages that conflict with those sent by the home computer 36 are discarded/ignored. The user may even prioritize instances/devices, such that a hierarchy of authority is maintained. Or individual responses have an established hierarchy. As an example, in the event of a conflict, a 'reschedule reminder' should always have priority over a 'dismiss reminder.'

The listing 64 of acknowledgements is also useful to the user. The listing 64 of acknowledgements logs each acknowledgement 24 and its corresponding date/time stamp 60 and the device identifier 62. The listing 64 of acknowledgements also shows the calendar event 18 that is associated with each acknowledgement 24. The listing 64 of acknowledgements is thus a helpful user interface that lists transactional activity between instances. When the user, e.g., a human user or software agent, accesses the user interface, the listing 64 of acknowledgements presents a log of acknowledgement activity. The user may thus determine how each reminder was acknowledged, and why calendar instances were remotely acknowledged. If, for example, the user doubts a reminder was acknowledged, the user can consult the listing 64 of acknowledgements and confirm their doubt. The user can thus consult the listing 64 of acknowledgements to see a complete record of acknowledgement transactions, thus helping resolve acknowledgement issues.

Figure 10:
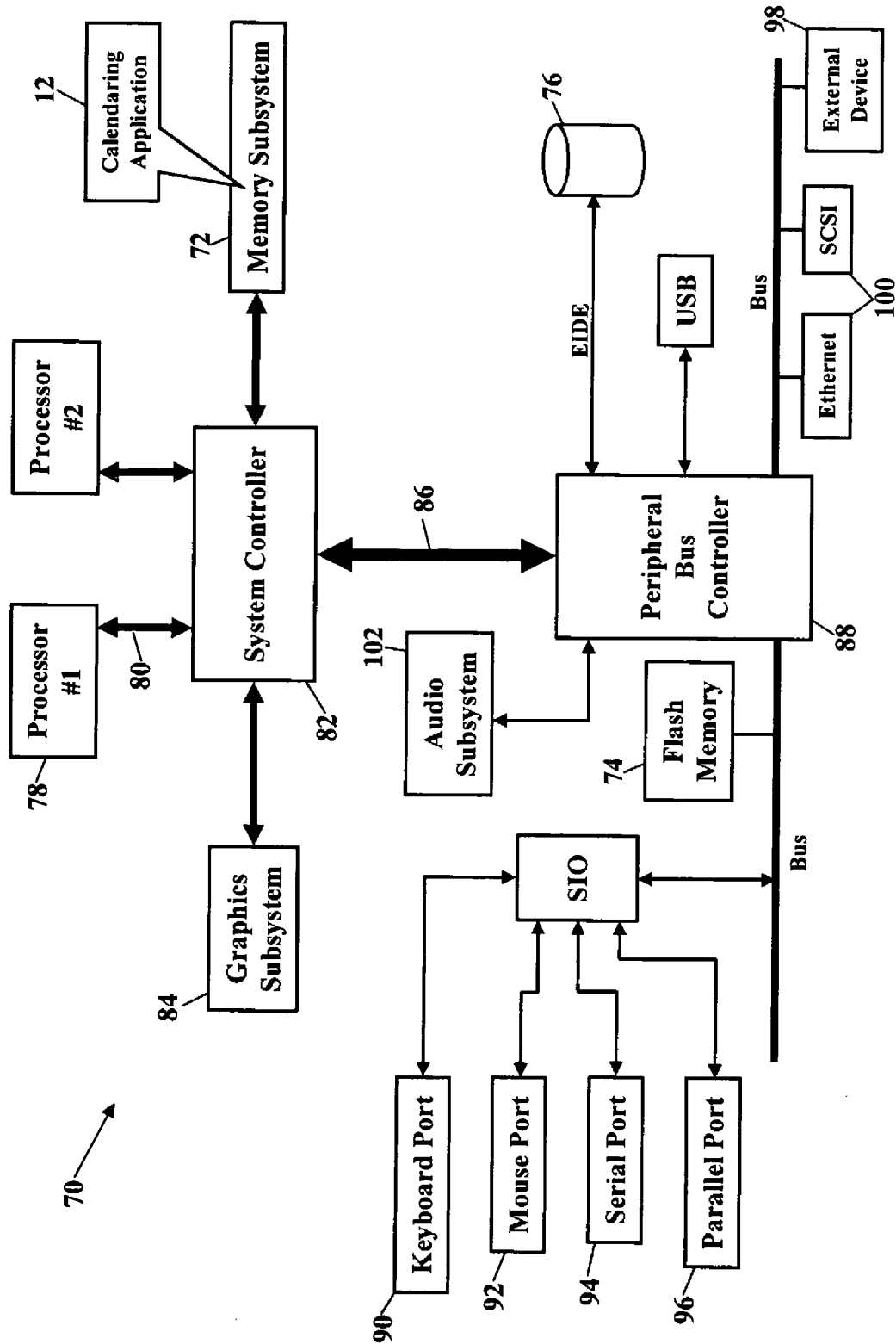
FIG. 10 illustrates an operating environment for the exemplary embodiments.

FIG. 10 depicts another possible operating environment for the exemplary embodiments. FIG. 10 is a block diagram showing the calendaring application 12 residing in a computer system 70 (such as the communications device 16 shown in FIG. 1). FIG. 10, however, may also represent a block diagram of any computer, communications device, or processor-controlled device. The calendaring application 12 operates within a system memory device. The calendaring application 12, for example, is shown residing in a memory subsystem 72. The calendaring application 12, however, could also reside in flash memory 74 or peripheral storage device 76. The computer system 70 also has one or more central processors 78 executing an operating system. The operating system, as is well known, has a set of instructions that control the internal functions of the computer system 70. A system bus 80 communicates signals, such as data signals, control signals, and address signals, between the central processor 78 and a system controller 82 (typically called a "Northbridge"). The system controller 82 provides a bridging function between the one or more central processors 78, a graphics subsystem 84, the memory subsystem 72, and a PCI (Peripheral Controller Interface) bus 86. The PCI bus 86 is controlled by a Peripheral Bus Controller 88. The Peripheral Bus Controller 88 (typically called a "Southbridge") is an integrated circuit that serves as an input/output hub for various peripheral ports. These peripheral ports could include, for example, a keyboard port 90, a mouse port 92, a serial port 94, and/or a parallel port 96 for a video display unit, one or more external device ports 98, and networking ports 100 (such as USB, SCSI, or Ethernet). The Peripheral Bus Controller 88 could also include an audio subsystem 102. Those of ordinary skill in the art understand that the program, processes, methods, and systems described herein are not limited to any particular computer system or computer hardware.

One example of the central processor 78 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, the WINDOWS® (WINDOWS® is a registered trademark of Microsoft Corporation, One Microsoft Way, Redmond Wash. 98052-6399, 425.882.8080, www.Microsoft.com) operating system may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 72, flash memory 74, or peripheral storage device 76) may also contain an application program. The application program cooperates with the operating system and with a video display unit (via the serial port 94 and/or the parallel port 96) to provide a Graphical User Interface (GUI). The Graphical User Interface typically includes a combination of signals communicated along the keyboard port 90 and the mouse port 92. The Graphical User Interface provides a convenient visual and/or audible interface with a user of the computer system 70.

Figure 11:
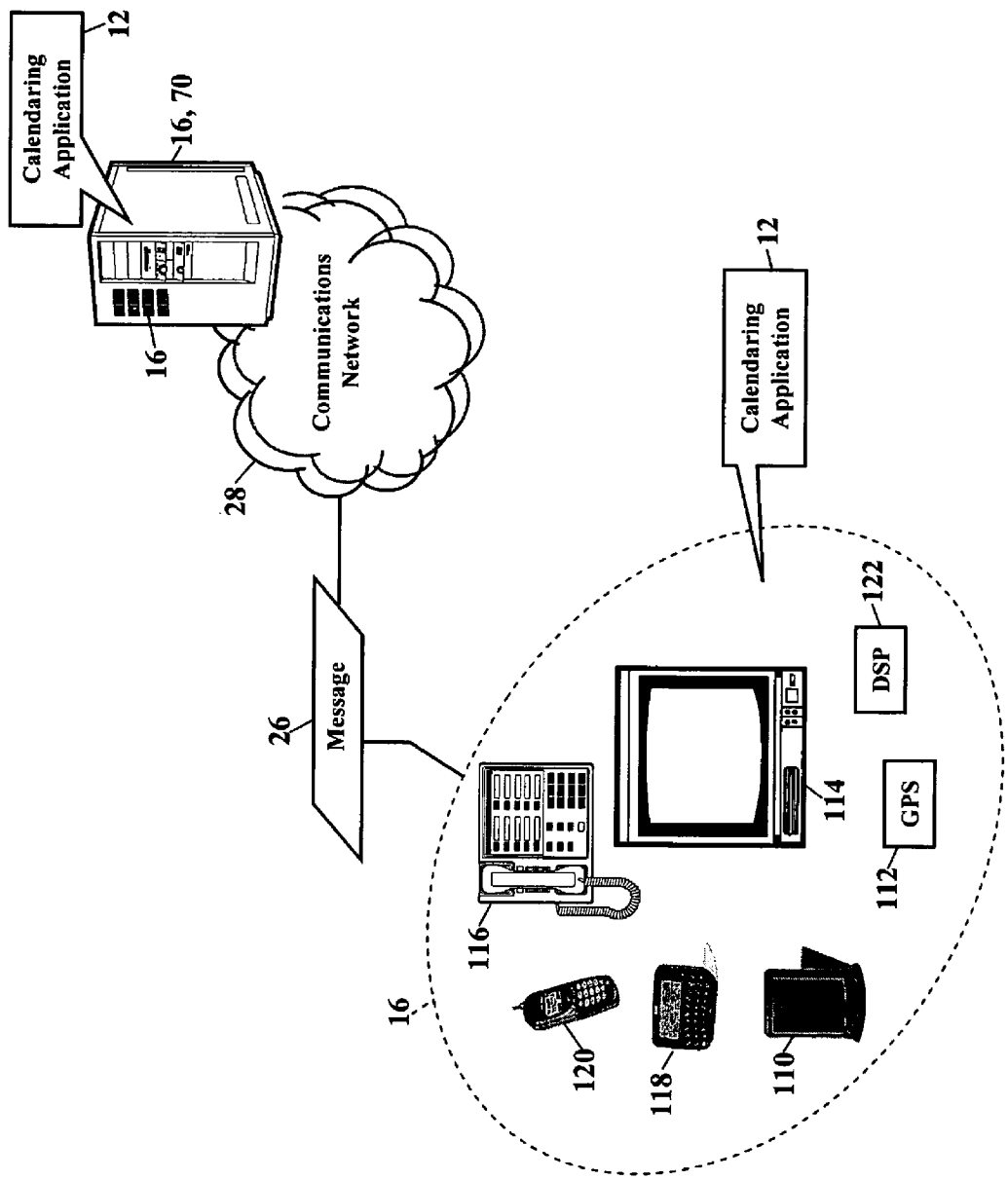
FIG. 11 is a schematic illustrating still more exemplary embodiments operating within various communications devices.

FIG. 11 is a schematic illustrating still more exemplary embodiments. FIG. 11 illustrates that the calendaring application 12 may alternatively or additionally operate within various communications devices 16. FIG. 11, for example, illustrates that the calendaring application 12 may entirely or partially operate within a personal digital assistant (PDA) 110, a Global Positioning System (GPS) device 112, an interactive television 114, an Internet Protocol (IP) phone 116, a pager 118, a cellular/satellite phone 120, or any computer system and/or communications device utilizing a digital signal processor (DSP) 122. The communications device 16 may also include watches, radios, vehicle electronics, clocks, printers, gateways, and other apparatuses and systems.

Figure 12:
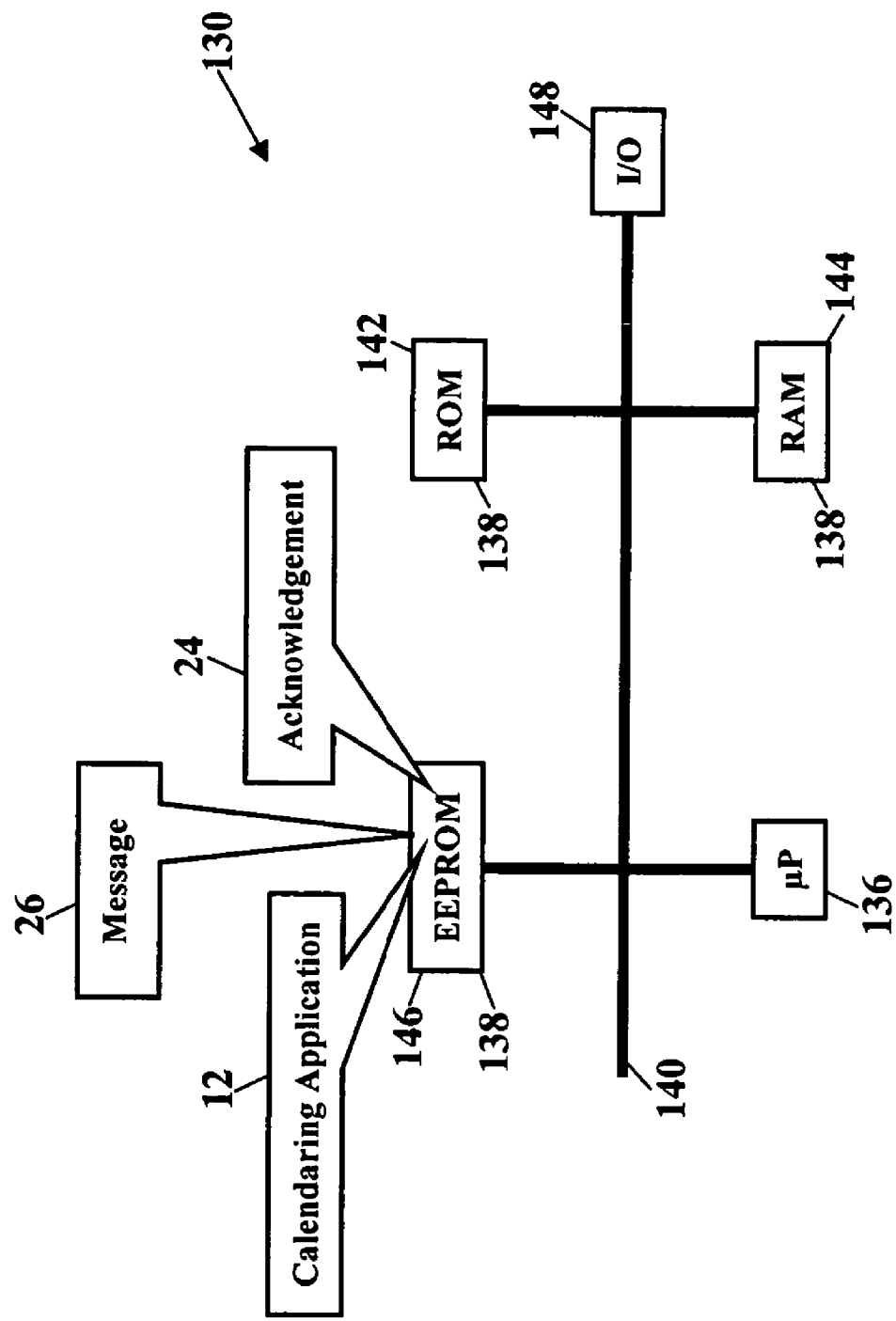
FIGS. 12-14 are schematics further illustrating various communications devices for processing the expiration, according to the exemplary embodiments.
Figure 13:
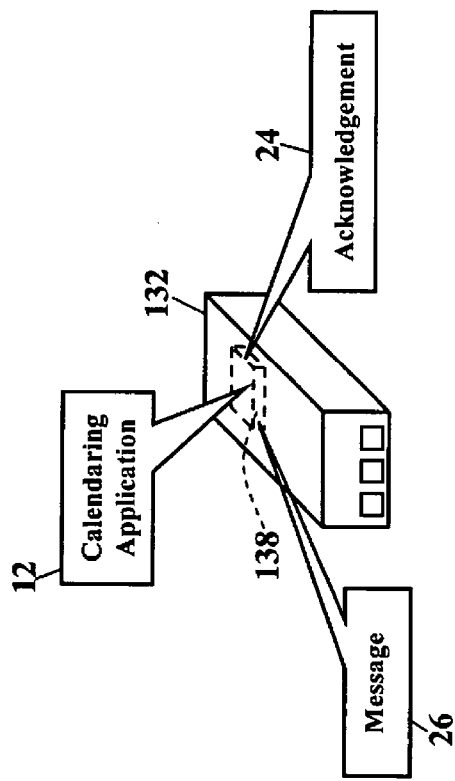
Figure 14:
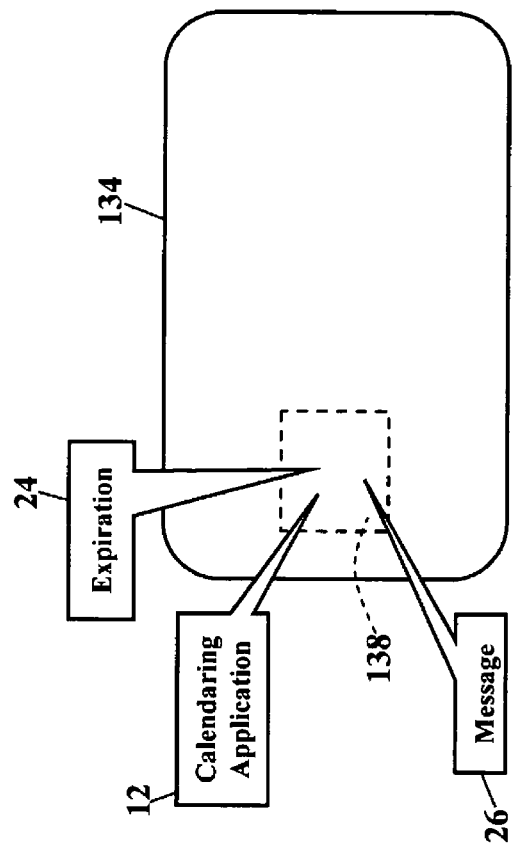

FIGS. 12-14 are schematics further illustrating various communications devices for processing the acknowledgement 24, according to the exemplary embodiments. FIG. 12 is a block diagram of a Subscriber Identity Module 130, while FIGS. 13 and 14 illustrate, respectively, the Subscriber Identity Module 130 embodied in a plug 132 and the Subscriber Identity Module 130 embodied in a card 134. As those of ordinary skill in the art recognize, the Subscriber Identity Module 130 may be used in conjunction with many communications devices (such as the cellular/satellite phone 120 shown in FIG. 11). The Subscriber Identity Module 130 stores user information (such as the user's International Mobile Subscriber Identity, the user's $K_i$ number, and other user information), the acknowledgement 24, and any portion of the calendaring application 12. As those of ordinary skill in the art also recognize, the plug 132 and the card 134 each interface with the communications device according to GSM Standards 2.17 and 11.11 and ISO Standard 7816, with each incorporated herein by reference. The GSM Standard 2.17 is formally known as "European digital cellular telecommunications system (Phase 1); *Subscriber Identity Modules, Functional Characteristics* (GSM 02.17 V3.2.0 (1995-01))." The GSM Standard 11.11 is formally known as "Digital cellular telecommunications system (Phase 2+) (GSM); *Specification of the Subscriber Identity Module—Mobile Equipment (Subscriber Identity Module—ME) interface* (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "*Information technology—Identification cards—Integrated circuit(s) cards with contacts*," and the standard is available from the International Organization for Standardization (ISO) (1, rue de Varembé, Case, postale 56CH-1211 Geneva 20, Switzerland, Telephone+41 22 749 01 11, Telefax+41 22 733 34 30, www.iso.org).

FIG. 12 is a block diagram of the Subscriber Identity Module 130, whether embodied as the plug 132 of FIG. 13 or as the card 134 of FIG. 14. Here the Subscriber Identity Module 130 comprises a microprocessor 136 (µP) communicating with memory modules 138 via a data bus 140. The memory modules may include Read Only Memory (ROM) 142, Random Access Memory (RAM) and or flash memory 144, and Electrically Erasable-Programmable Read Only Memory (EEPROM) 146. The Subscriber Identity Module 130 stores some or all of the calendaring application 12 in one or more of the memory modules 138. FIG. 12 shows the calendaring application 12 residing in the Erasable-Programmable Read Only Memory 146, yet the calendaring application 12 could alternatively or additionally reside in the Read Only Memory 142 and/or the Random Access/Flash Memory 144. An Input/Output module 148 handles communication between the Subscriber Identity Module 130 and the communications device. As those skilled in the art will appreciate, there are many suitable ways for implementing the operation and physical/memory structure of the Subscriber Identity Module. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 15:
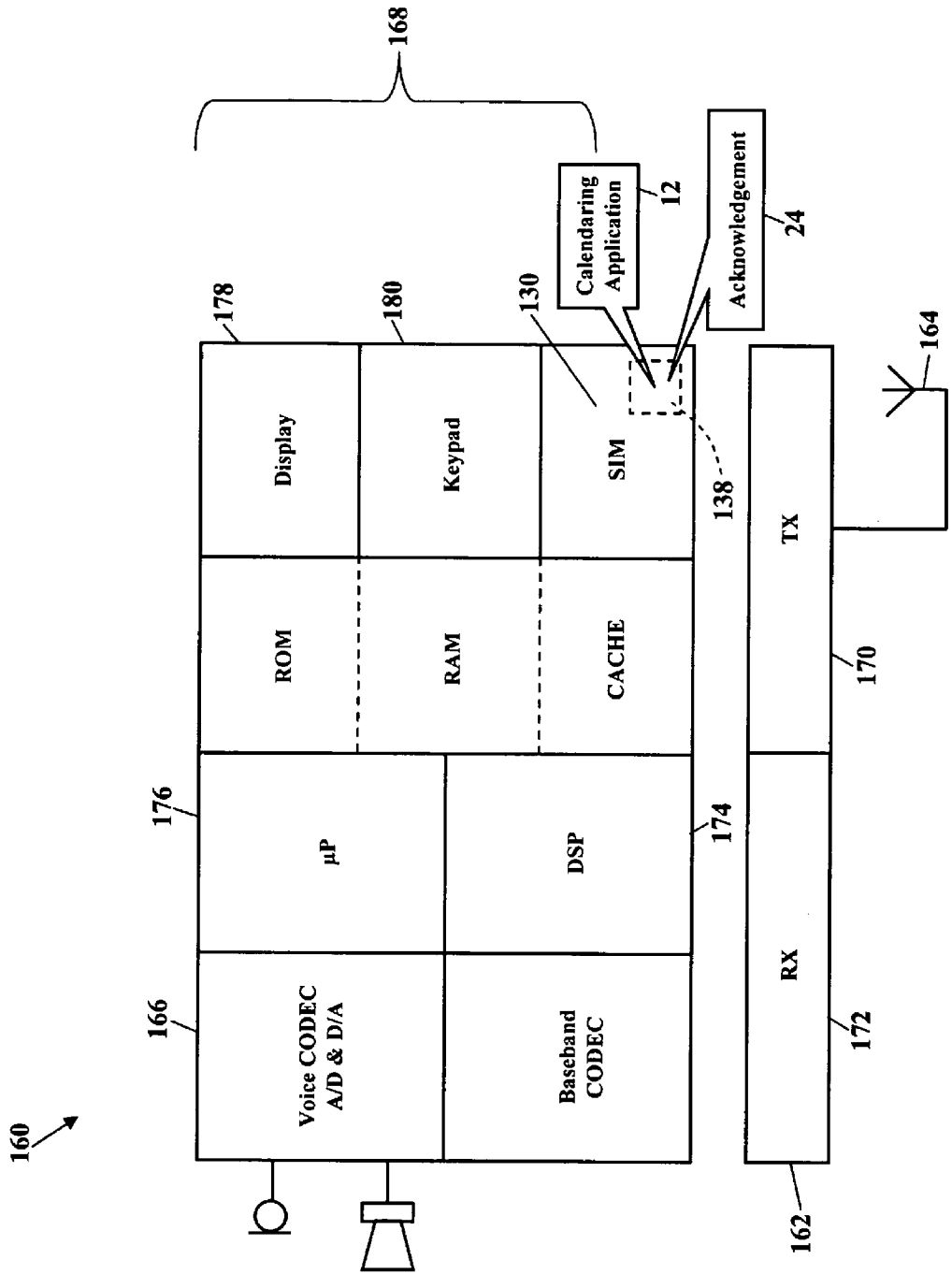
FIG. 15 is a schematic further illustrating various communications devices for processing the expiration, according to the exemplary embodiments.

FIG. 15 is a schematic further illustrating various communications devices for processing the acknowledgement 24, according to the exemplary embodiments. FIG. 15 is a block diagram of another communications device 160 utilizing the acknowledgement 24 in the calendaring application 12. Here the communications device 160 comprises a radio transceiver unit 162, an antenna 164, a digital baseband chipset 166, and a man/machine interface (MMI) 168. The transceiver unit 162 includes transmitter circuitry 170 and receiver circuitry 172 for receiving and transmitting signals. The transceiver unit 162 couples to the antenna 164 for converting electrical current to and from electromagnetic waves. The digital baseband chipset 166 contains a digital signal processor (DSP) 174 and performs signal processing functions for audio (voice) signals and RF signals. As FIG. 15 shows, the digital baseband chipset 166 may also include an on-board microprocessor 176 that interacts with the man/machine interface (MMI) 168. The man/machine interface (MMI) 168 may comprise a display device 178, a keypad 180, and the Subscriber Identity Module 130. The on-board microprocessor 176 performs GSM protocol functions and control functions for the radio circuitry 170 and 172, for the display device 178, and for the keypad 180. The on-board microprocessor 176 may also interface with the Subscriber Identity Module 130 and with the calendaring application 12 residing in the memory module 138 of the Subscriber Identity Module 130. Those skilled in the art will appreciate that there may be many suitable architectural configurations for the elements of the communications device 160. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997), with each incorporated herein by reference.

The acknowledgement 24 may be utilized regardless of signaling standard. As those of ordinary skill in the art recognize, FIGS. 12-15 illustrate a Global System for Mobile (GSM) communications device. That is, the communications device utilizes the Global System for Mobile (GSM) communications signaling standard. Those of ordinary skill in the art, however, also recognize the concepts of the acknowledgement 24 are equally applicable to any communications device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard.

FIG. 16 is a flowchart illustrating a method of acknowledging a reminder in a calendaring application according to an exemplary embodiment. A calendar entry, corresponding to an event and a rule, is stored (Block 200). The rule comprises a reminder of the event (Block 202). The rule may also comprise an element or parameter that permits (Block 204) or prevents (Block 206) remotely acknowledging the reminder. The reminder is presented according to the rule (Block 208). An acknowledgement of the reminder is received (Block 210) and date/time stamped (Block 212). A message is prepared by retrieving a destination from memory, with the memory storing a list of destinations at which other instances of the calendaring application reside (Block 214). The message is then communicated effectively in real-time by a wireless and/or wireline network to similarly acknowledge a pending reminder that corresponds to the same event in another instance of the calendaring application (Block 216). The message may comprise a request for synchronization in response to the acknowledgement, wherein each acknowledgment requests a corresponding synchronization (Block 218). The message may or alternatively comprise an instruction to similarly acknowledge the pending reminder in the another instance of the calendaring application (Block 220). The calendaring application may receive a second message (Block 222). This second message may indicate the request for synchronization was successful or unsuccessful, the instruction was or was not received at the destination, the pending reminder was similarly acknowledged at the destination, or the instruction was denied by the destination.

The calendaring application (shown as reference numeral 12 in FIGS. 1-14) may be physically embodied on or in a computer-readable storage medium. This computer-readable storage medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000). This computer-readable storage medium, or media, could be distributed to end-users, licensees, and assignees. The calendaring application comprises computer-readable instructions/code for acknowledging a reminder. A calendar entry corresponding to an event and a rule is stored. The rule comprises the reminder of the event. The reminder is presented according to the rule, and an acknowledgement is received. A message is then communicated effectively in real-time to similarly acknowledge a pending reminder that corresponds to the same event in another instance of the calendaring application The calendaring application may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager. Those of ordinary skill in the art will recognize that this solution applies to like addressing schemes that may be developed in the future.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A method of acknowledging a reminder in a calendaring application, comprising:
    storing a calendar entry corresponding to an event and a rule, the rule comprising the reminder of the event;
    presenting, at a device, an alert of the reminder according to the rule;
    receiving an acknowledgement of the reminder;
    displaying a global configuration option in a first graphical user interface that determines whether remote acknowledgement is globally permissible for all instances of the calendaring application operating in different devices;
    enabling messaging with the acknowledgement of the reminder when a user's first response to the global configuration option permits remote acknowledgement;
    disabling the messaging when the user's first response to the global configuration option denies remote acknowledgement;
    displaying a device-level configuration option in a second graphical user interface that determines whether each individual instance of the calendaring application participates in the remote acknowledgement of the reminder;
    when a selection is received in the device-level configuration option that permits the remote acknowledgement of an instance of the calendaring application, then communicating in real-time a message from the device to similarly acknowledge a pending reminder that corresponds to the same event in another instance of the calendaring application operating in another device;
    when the selection of the device-level configuration option denies participation in the remote acknowledgement, then declining to send the message from the device; and
    when the device-level configuration option is unspecified, then processing the message according to the global configuration option.

2. The method according to claim 1, wherein communicating the message comprises communicating a request for synchronization in response to the acknowledgement, wherein each acknowledgment requests a corresponding synchronization.

3. The method according to claim 2, further comprising receiving a second message, the second message indicating at least one of i) the request for synchronization was successful and ii) the request for synchronization was unsuccessful.

4. The method according to claim 1, wherein communicating the message comprises communicating the message to a destination, the message comprising an instruction to similarly acknowledge the pending reminder in the another instance of the calendaring application.

5. The method according to claim 4, further comprising receiving a second message, the second message indicating the instruction was denied by the destination.

6. The method according to claim 4, further comprising retrieving the destination from memory, the memory storing a list of destinations at which other instances of the calendaring application reside.

7. The method according to claim 1, wherein communicating the message comprises wirelessly communicating the message.

8. The method according to claim 1, wherein storing the calendar entry comprises storing an element of the rule that permits remotely acknowledging the reminder.

9. The method according to claim 1, wherein storing the calendar entry comprises storing an element of the rule that prevents remotely acknowledging the reminder.

10. A system, comprising:
    a processor executing calendaring application stored in memory that causes the processor to:
    store a calendar entry corresponding to an event and a rule, the rule comprising the reminder of the event;
    display a global configuration option in a first graphical user interface that determines whether remote acknowledgement is globally permissible for all instances of the calendaring application operating in different devices;

enable messaging with the acknowledgement of the reminder when a user's first response to the global configuration option permits remote acknowledgement;

disable the messaging when the user's first response to the global configuration option denies remote acknowledgement;

display a device-level configuration option in a second graphical user interface that determines whether each individual instance of the calendaring application participates in the remote acknowledgement of the reminder;

present the reminder according to the rule;

receive an acknowledgement of the reminder;

when a selection is received in the device-level configuration option that permits the remote acknowledgement of an instance of the calendaring application, then communicating in real-time a message from the device to similarly acknowledge a pending reminder that corresponds to the event in another instance of the calendaring application operating in another device;

when the selection of the device-level configuration option denies participation in the remote acknowledgement, then declining to send the message from the device;

when the device-level configuration option is unspecified, then processing the message according to the global configuration option.

11. The system according to claim 10, wherein the code further causes the processor to communicate a request for synchronization in response to the acknowledgement, wherein each acknowledgment requests a corresponding synchronization.

12. The system according to claim 11, wherein the code further causes the processor to receive a second message, the second message indicating at least one of i) the request for synchronization was successful and ii) the request for synchronization was unsuccessful.

13. The system according to claim 10, wherein the code further causes the processor to communicate the message to a destination, the message comprising an instruction to similarly acknowledge the pending reminder in the another instance of the calendaring application.

14. The system according to claim 13, wherein the code further causes the processor to receive a second message, the second message indicating the pending reminder was not acknowledged at the destination.

15. The system according to claim 13, wherein the code further causes the processor to retrieve the destination from the memory, the memory storing a list of destinations at which other instances of the calendaring application reside.

16. The system according to claim 10, wherein the code further causes the processor to wirelessly communicate the message.

17. A computer readable storage medium storing processor executable instructions for performing a method, the method comprising:

storing a calendar entry corresponding to an event and a rule, the rule comprising the reminder of the event;

displaying a global configuration option in a first graphical user interface that determines whether remote acknowledgement is globally permissible for all instances of the calendaring application operating in different devices;

enabling messaging with the acknowledgement of the reminder when a user's first response to the global configuration option permits remote acknowledgement;

disabling the messaging when the user's first response to the global configuration option denies remote acknowledgement;

displaying a device-level configuration option in a second graphical user interface that determines whether each individual instance of the calendaring application participates in the remote acknowledgement of the reminder;

presenting the reminder according to the rule;

receiving an acknowledgement of the reminder;

when a selection is received in the device-level configuration option that permits the remote acknowledgement of an instance of the calendaring application, then communicating in real-time a message from the device to similarly acknowledge a pending reminder that corresponds to the event in another instance of the calendaring application operating in another device;

when the selection of the device-level configuration option denies participation in the remote acknowledgement, then declining to send the message from the device;

when the device-level configuration option is unspecified, then processing the message according to the global configuration option.

18. The computer program product according to claim 17, further comprising instructions for retrieving a destination for the message.

* * * * *